United States Patent
Pischel (10) Patent No.: US 11,418,898 B2
(45) Date of Patent: Aug. 16, 2022

(54) METHOD FOR OPERATING A HEARING SYSTEM AND HEARING SYSTEM

(71) Applicant: Sivantos Pte. Ltd., Singapore (SG)

(72) Inventor: Judith Pischel, Nuremberg (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 17/218,222

(22) Filed: Mar. 31, 2021

(65) Prior Publication Data
US 2021/0314711 A1  Oct. 7, 2021

(30) Foreign Application Priority Data
Apr. 2, 2020  (DE) .......................... 102020204332.9

(51) Int. Cl.
*H04R 25/00* (2006.01)
*A63F 13/215* (2014.01)
*G06T 11/00* (2006.01)
*H04M 1/72478* (2021.01)

(52) U.S. Cl.
CPC ......... *H04R 25/554* (2013.01); *A63F 13/215* (2014.09); *G06T 11/00* (2013.01); *H04R 25/40* (2013.01); *H04R 25/43* (2013.01); *H04M 1/72478* (2021.01)

(58) Field of Classification Search
CPC .... H04R 2225/55; H04R 25/40; H04R 25/43; H04R 25/554; H04R 25/558
See application file for complete search history.

(56) References Cited

U.S. PATENT DOCUMENTS

| | | | |
|---|---|---|---|
| 9,332,211 B2 | 5/2016 | Lee et al. |
| 9,516,430 B2 | 12/2016 | Jensen et al. |
| 9,539,498 B1 | 1/2017 | Hanke et al. |
| 9,669,296 B1 | 6/2017 | Hibbert et al. |
| 9,986,346 B2 | 5/2018 | Bendsen |
| 10,123,134 B2 | 11/2018 | Jensen et al. |
| 10,353,198 B2 | 7/2019 | Sakai |
| 2015/0271607 A1 | 9/2015 | Sabin |
| 2015/0271608 A1 | 9/2015 | Sabin |

(Continued)

FOREIGN PATENT DOCUMENTS

| | | |
|---|---|---|
| EP | 2469323 A1 | 6/2012 |
| EP | 2680615 A1 | 1/2014 |

(Continued)

*Primary Examiner* — Phylesha Dabney
(74) *Attorney, Agent, or Firm* — Laurence A. Greenberg; Werner H. Stemer; Ralph E. Locher (57) ABSTRACT

A method for operating a hearing system is specified. The hearing system includes a hearing aid, which is worn by a user. The hearing system includes an auxiliary device, which includes a camera, by which a real-time image is recorded of a current environment. The auxiliary device includes a display screen, on which the real-time image is output, so that the environment is displayed on the display screen. The hearing aid transmits an item of information to the auxiliary device, which is linked to a section of the environment and is thus an item of information with respect to this section. The information is also displayed on the display screen, in that an image element is generated and is overlaid with the real-time image in such a way that it is recognizable for the user with which section of the environment the information is linked.

16 Claims, 4 Drawing Sheets

(56) References Cited

U.S. PATENT DOCUMENTS

| | | |
|---|---|---|
| 2017/0208402 A1 | 7/2017 | Ramussen et al. |
| 2018/0088900 A1 | 3/2018 | Glaser et al. |
| 2020/0251120 A1* | 8/2020 | Froehlich ............ G10L 21/0272 |
| 2020/0296521 A1* | 9/2020 | Wexler ................. H04R 25/558 |

FOREIGN PATENT DOCUMENTS

| | | |
|---|---|---|
| EP | 2928214 A1 | 10/2015 |
| EP | 3054706 A2 | 8/2016 |
| EP | 3120578 B1 | 10/2018 |

* cited by examiner

METHOD FOR OPERATING A HEARING SYSTEM AND HEARING SYSTEM

CROSS-REFERENCE TO RELATED APPLICATION

This application claims the priority, under 35 U.S.C. § 119, of German Patent Application DE 10 2020 204 332.9, filed Apr. 2, 2020; the prior application is herewith incorporated by reference in its entirety.

BACKGROUND OF THE INVENTION

Field of the Invention

The invention relates to a method for operating a hearing system and a corresponding hearing system.

A hearing system includes a hearing aid, which is worn by a user on or in the ear. The hearing aid receives sounds from the environment by means of one or more microphones and generates electrical input signals, which are converted via a receiver of the hearing aid back into sounds and are output to the user. The electrical input signals are processed by a signal processing unit to form electrical output signals for the receiver, in order to adapt the hearing experience and the perception of the sounds to the personal requirements of the user. A hearing aid is typically used to care for a hearing-impaired user, i.e., to compensate for a hearing deficit of the user. The signal processing unit processes the electrical input signals in such a way that the hearing deficit is compensated for. Furthermore, a hearing system often includes an auxiliary device, which is connected to the hearing aid in order to exchange data.

For example, a system having a recommendation engine is described in European patent EP 3 120 578 B1, corresponding to U.S. patent publication Nos. 2015/0271608 and 2015/0271607, which can communicate via a mobile device with a hearing assistance device.

A binaural hearing assistance system is described in published, European patent application EP 2 928 214 A1, corresponding to U.S. Pat. Nos. 10,123,134 and 9,516,430, having two hearing assistance devices and having a user interface, which can communicate with the hearing assistance devices.

U.S. Pat. No. 9,669,296 B1 describes a method for providing a game having parallel reality. A system and a method are described to link an activity in the real world to a location-based parallel game reality.

U.S. Pat. No. 9,539,498 B1 describes a method for mapping actions in the real world on a virtual world having a parallel game reality. The virtual world has experiences which are influenced by actions in the real world.

BRIEF SUMMARY OF THE INVENTION

Against this background, it is an object of the invention to improve the operation of a hearing system and make it as intuitive as possible for a user. The operation of a hearing system and especially a hearing aid is to have as little complexity as possible for the user.

The object is achieved according to the invention by a method having the features according to the independent method claim, by a hearing system having the features according to the independent hearing system claim, and by a computer program product having the features according to independent computer program product claim. Advantageous embodiments, refinements, and variants are the subject matter of the dependent claims. The object is furthermore achieved independently in particular in each case by a hearing aid and by an auxiliary device, which are each designed to carry out the method. The statements in conjunction with the method also apply accordingly to the hearing system, the computer program product, the hearing aid, and the auxiliary device and vice versa. When method steps of the method are described hereinafter, advantageous embodiments result for the hearing system, the hearing aid, and the auxiliary system in particular in that they are designed to execute one or more of these method steps.

The method is used for operating a hearing system. The hearing system includes a hearing aid, which is worn by a user. Furthermore, the hearing system includes an auxiliary device, which includes a camera by means of which a real-time image is recorded of a current environment. The auxiliary device includes a display screen, on which the real-time image is output, so that the environment is displayed in particular in real time on the display screen. The method is thus also used in particular for operating the hearing aid and the auxiliary device. The environment is real and is thus a reality, the real-time image is a depiction of this reality.

One core concept of the invention is in particular the creation of an expanded reality (also referred to as "augmented reality") on the auxiliary device by linking the environment to items of information, i.e., data, from the hearing aid. For this purpose, the hearing aid transmits an item of information to the auxiliary device, which is linked to a section of the environment and is thus an item of information on this section. The information is then displayed on the display screen in that an image element is generated and is overlaid with the real-time image in such a way that it is recognizable to the user with which section of the environment the information is linked. The information from the hearing aid is thus projected as a virtual image in a depiction of the real environment. The advantage results therefrom that the relationship between the environment and the items of information from the hearing aid is illustrated to the user on the display screen and furthermore a particularly intuitive approach to understanding the operation of the hearing aid is enabled for the user.

"Linked" is understood in particular to mean that the information describes a property or an aspect of the section or an object therein or a setting of the hearing aid for interaction with the section or an object therein. In other words: the information is generally an item of environmental or hearing aid information and specifies in particular how the hearing aid assesses (environmental information) or processes (hearing aid information) a sound signal from a section of the environment. The information is, for example, a specific value of an operating parameter of the hearing aid and is then an item of hearing aid information or a value of a property of a section of the environment, especially a sound signal from this section, and then an item of environmental information.

The specific embodiment of the information is primarily not relevant as such, however, it is more important that the information is displayed in a specific way on the display screen, namely not simply as mere data without reference to the environment, but rather as an overlay in such a way that the information is visually associated in the real-time image with that section of the environment which is linked to the information. For this purpose, the information is converted for display into an image element, which is overlaid with the real-time image, so that an augmented reality is displayed on the display screen, in which the real-time image is the reality and the image element, i.e., the information, is an augmentation of this reality. In these terms, the real-time image is real, since its elements are acquired by the camera, and the image element is virtual, since it is not acquired by the camera, but is additionally generated, preferably by a control unit of the auxiliary device.

The environment is typically divided into multiple sections, so that accordingly the real-time image is also divided into multiple image parts, wherein each image part represents one section and vice versa. A respective section is, for example, a spatial region which is occupied by an object, for example a person, or an angle region or solid angle region, for example the environment is divided into multiple angle regions starting from the user, or the section is a region of the environment at least partially delimited in another way. The precise delimitation of the section in relation to the remaining environment is in particular dependent on the type of the information.

The image element is suitably a marking, which points to the section or is displayed therein or thereon, e.g., a symbol, an icon, an arrow, a circle, a cross, a line, or the like. Alternatively, the image element is a text element in or on the section, a frame around the section, a border of the section, a color, transparency, image sharpness, or contrast of that part of the real-time image which shows the section, or lines for marking the section. Combinations of the above-mentioned embodiments are also suitable. The specific embodiment of the image element is dependent in particular on the type of information which is displayed.

One starting point of the invention is in particular the observation that a hearing aid typically includes one or more operating elements, by means of which one or more operating parameters of the hearing aid may be set by the user. Examples of such operating parameters are an amplification factor of the hearing aid, an alignment or a width of a directional lobe of a directional microphone of the hearing aid for spatial focusing, and the like. Examples of operating elements are switches, buttons, wheels, and rocker switches. Alternatively or additionally, an operating parameter is settable via a separate auxiliary device, for example by means of a smart phone.

A further starting point of the invention is in particular the observation that for demonstration of a hearing aid and its functional scope in operation, for example in the context of a product presentation, so-called demo apps are used to demonstrate the operation of the hearing aid to a potential user in different situations.

The setting of operating parameters by operating elements on the hearing aid itself is typically only possible to a limited extent due to the size of the hearing aid and is also not necessarily intuitive, since the effects of a change are not immediately visible. Feedback to the user about how one or more operating parameters are set at the current time is also only possible to a restricted extent and is not necessarily comfortable or comprehensible for the user.

In comparison to an operating element on the hearing aid, an auxiliary device for setting operating parameters offers increased comfort and improved scope and also more extensive feedback via a display. Especially in the case of a smart phone as an auxiliary device, improved setting and monitoring of operation of the hearing aid is advantageously enabled by means of a computer program product, for example an app, which runs on the auxiliary device. The auxiliary device displays on a display screen, for example, which of multiple operating programs of the hearing aid is activated or enables the setting of an operating parameter, for example a spatial focus, and thus in a simple way also a demonstration of the functional scope of a hearing aid.

However, it is disadvantageous that furthermore a relationship to the actual environment is absent. The settings and the behavior of the hearing aid in operation are not directly linked to the environment of the user and the interaction of the hearing aid with the environment in operation is not readily recognizable to the user. In other words: the user always has to undertake a certain mental exertion to link the performed settings and their effects to the actual environment. For example, it is indicated to the user on the auxiliary device that a directional lobe of the hearing aid is aligned at a specific angle, for example relative to the viewing direction, but this information is not directly related to the environment, so that it is not recognizable to the user which section of the environment is affected thereby.

In the present case, a linkage of an item of information to a section of the environment is advantageously also actually displayed to the user, namely via the augmented reality on the display screen. The information is advantageously displayed and overlaid with the real-time image, i.e., the image of the actual environment, in such a way that it is recognizable directly and intuitively for the user, i.e., in particular without mental exertion, which relationship the information has to the environment.

The hearing aid is preferably used to care for a hearing-impaired user. For this purpose, the hearing aid includes at least one microphone, which receives sound from the environment and generates an electrical input signal. This is supplied for modification to a signal processing unit of the hearing aid. The signal processing unit is preferably a part of the control unit. The modification takes place in particular on the basis of an individual audiogram of the user, which is associated with the hearing aid, so that an individual hearing deficit of the user is compensated for. The signal processing unit outputs as a result an electrical output signal, which is then converted via a receiver of the hearing aid back into sound and is output to the user.

The hearing aid is preferably a binaural hearing aid, having two individual devices, which each include at least one microphone and one receiver and which are worn by the user on different sides of the head, namely once on or in the left ear and once on or in the right ear. Aside from such a binaural hearing aid, an embodiment is also possible and suitable in which the hearing aid has two individual devices as described, of which only one includes a receiver and the other does not, however.

The auxiliary device is preferably an individual device in which the camera and the display screen are combined. In a suitable embodiment for this purpose, the auxiliary device is a smart phone. Alternatively, however, an embodiment is also suitable in which the auxiliary device includes the camera and the display screen as two separate devices.

To transmit the information, the hearing aid and the auxiliary device each have an interface for data transmission, for example a Bluetooth interface, and are connected or coupled to one another via these interfaces. During the data transmission, at least the information is then transmitted from the hearing aid to the auxiliary device.

A relative location of the hearing aid and the auxiliary device in relation to one another is expediently determined in order to be able to reproduce the linkage of the information to the section particularly accurately in this way. For example, the respective position of the hearing aid and the auxiliary device is ascertained by means of suitable sensors, e.g., a gyroscope, a magnetic field sensor, an acceleration sensor, or a GPS system, and on the basis of this the relative location is determined. To improve the accuracy, the respective alignment of the hearing aid and the auxiliary device is suitably measured, for example by means of suitable sensors, for example acceleration sensors. However, an embodiment is also suitable in principle in which the relative location is estimated without additional measurement. For example, it is simply presumed that the camera is aligned in accordance with the viewing direction of the user and/or the position of the user is equated to the position of the camera. Alternatively, for example, in the case of a smart phone as the auxiliary device, it is presumed that the user holds it at a distance of less than 10 cm in front of himself and approximately at eye height, so that it is then presumed that the auxiliary device is located, for example, 20 cm in the viewing direction in front of the hearing aid and the camera is aligned in the viewing direction. For the hearing aid, it is presumed that it is worn in or on one or both ears of the user.

In one advantageous embodiment, the information is a presence of a sound source in the section. The hearing aid recognizes the presence of the sound source and transmits this to the auxiliary device, for display in the real-time image. In the real-time image, the image element then marks the section in order to indicate the presence of the sound source therein. It is thus immediately recognizable for the user on the display screen where in the environment the hearing aid recognizes a sound source. It is initially unimportant how the hearing aid recognizes the sound source. The hearing aid expediently has an appropriately designed analysis unit for recognizing a sound source, for example as part of a control unit of the hearing aid.

The hearing aid expediently does not solely recognize the mere presence of a sound source, but also its position, in particular relative to the hearing aid, i.e., the section in which the sound source is located. This position is also expediently transmitted to the auxiliary device, so that it displays the presence of the corresponding position in the real-time image. The image element for representing the presence of a sound source in a specific section is, for example, an arrow or a frame.

In addition, the hearing aid advantageously also determines a class of the sound source, i.e., which type the sound source is. For this purpose, the hearing aid includes, for example a classifier, for example as part of the control unit. The input signal of the microphone is supplied to the classifier and classified therein. The class is also an item of information which is expediently displayed at a corresponding point in the real-time image. Especially a symbol or a text element is suitable to display the class of a sound source.

In one suitable embodiment, the sound source is a conversation partner of the user and is marked as such in the real-time image by means of the image element. In other words: the sound source has a class which is recognized by the hearing aid as "conversation partner" and is then displayed by the auxiliary device. It is thus immediately recognizable to the user via the display screen where the hearing aid has identified a conversation partner in the environment.

In one advantageous embodiment, an angle is displayed in the real-time image, at which the sound source is located relative to the viewing direction of the user. For example, the angle is represented as a pair of two lines or arrows, one in the viewing direction and a further one from the user toward the sound source. Alternatively or additionally, the angle is simply displayed as a number in the vicinity of the sound source in such a way that the angle is associated as unambiguously as possible with this sound source for the user.

In one advantageous embodiment, the information is a signal-to-noise ratio, abbreviated to SNR, of the section. The hearing aid measures the SNR in the section, for example by means of an analysis unit as part of the control unit. The SNR is then transmitted to the auxiliary device as information for display in the real-time image. The image element then indicates the SNR, more precisely the SNR for the section. Accordingly, the SNR is expediently measured separately in each case for multiple different sections and thus an SNR map is more or less overlaid on the display screen on the real-time image, so that the user can read off the SNR directly for a respective section of the environment.

In one advantageous embodiment, the information indicates whether an interference noise suppression of the hearing aid is activated for the section. The interference noise suppression is, for example a part of the control unit of the hearing aid and is designed in such a way that in the activated state it suppresses interference noises in the input signal. The interference noise suppression is in particular activatable selectively for one or more sections, so that different sections and interference noise sources located therein can be suppressed at different strengths. The image element now indicates whether the interference noise suppression is activated for the respective section.

In one expedient embodiment, the information not only specifies whether an interference noise suppression is activated for the section, but more precisely how strongly interference noises from the section are suppressed by the interference noise suppression. For this purpose, for example, a damping factor is displayed as a text element in the real-time image.

In one advantageous embodiment, the image element is a colored or transparent area or both, which are overlaid in the real-time image with the section, so that it is displayed colored or transparent or both depending on the information. A discrete representation is suitable, for example in that coloration takes place above a threshold value and does not below the threshold value, or a continuous representation, in which, for example the coloration takes place with a color strength which is dependent on the specific value of the information. For example, sections of the environment having low SNR are colored green on the display screen and those having high SNR are colored red. Especially in the case of the coloration of entire areas of the real-time image, a transparent image element is expedient to ensure optimum recognizability of the real-time image located behind it. "Transparent" is understood in particular as a transparency<100%.

The above-described embodiments predominantly relate to items of information which are environmental items of information, i.e., items of information which are properties of the environment and which are ascertained by the hearing aid by analysis of sound signals from the environment. In the case of hearing aid items of information, such an analysis of the environment is initially not absolutely required, rather a representation of such items of information is intended to illustrate to the user the behavior of the hearing aid relative to the environment. The representation of an item of hearing aid information is particularly advantageous in the case of a hearing aid which is designed for directional hearing and includes a microphone for this purpose, which is designed as a directional microphone, in order to emphasize sound signals from a specific direction, i.e., from a specific section, over sound signals from other directions, i.e., from other sections.

In one advantageous embodiment, the hearing aid is switchable between a non-oriented and an oriented operating mode. In the oriented operating mode, the image element indicates which section of the environment is emphasized over the remaining environment. In the non-oriented operating mode, in contrast, no image element is displayed or the image element indicates that no section of the environment is emphasized. It is then immediately recognizable to the user on the display screen whether the hearing aid is in the non-oriented operating mode (also: omnidirectional operation) or in the oriented operating mode (also: directional operation, for example mono-directional or multidirectional operation). In the latter case, it is then also immediately recognizable to the user on which section or on which sections the directional microphone is oriented.

In one advantageous embodiment, the hearing aid includes a microphone which is designed as a directional microphone, having at least one directional lobe which is oriented on the section and covers it, so that correspondingly sound signals from this section are emphasized over sound signals from other sections. The information is a dimension, preferably a width, or an alignment, preferably a direction, of the directional lobe or both. The image element represents the directional lobe and thus indicates in the real-time image which section of the environment is covered by the directional lobe and correspondingly from which section sound signals are emphasized. The image element is preferably a visual representation of the directional lobe, having corresponding dimension and/or alignment. However, a simple line or another representation is also suitable, for example. Since the directional lobe is not visible to the user in the actual environment, in this way an intuitive representation of the directional lobe and its location in the environment is offered to the user via the display screen, so that the user can recognize immediately and without further effort how the directional lobe is dimensioned and/or aligned relative to the environment and accordingly which sections of the environment and thus which sound sources thereof are possibly affected.

The display screen of the auxiliary device is preferably also designed as an input device, by means of which one or more operating parameters of the hearing aid are settable. In this way, a particularly intuitive operation is also implemented, using which the hearing aid is settable in a simple manner. The effects of a respective setting are recognizable directly to the user on the basis of the real-time image and the information overlaid thereon. For example, the dimension or the alignment of the directional lobe or both are settable by the user directly in the real-time image.

An embodiment is also suitable in which alternatively or additionally to the display screen as the input device, the auxiliary device or the hearing aid includes one or more operating elements for setting one or more operating parameters of the hearing aid. The effects of a setting by means of these operating elements are then advantageously directly recognizable on the display screen to the user.

An embodiment is also expedient in which an avatar is overlaid with the real-time image in order to display a position of the user in the environment therein. The avatar is accordingly a virtual representation of the user on the display screen and thus locates the user within the augmented reality. If user and camera are located on different sides of the display screen, the positioning of the avatar either solely represents an approximation in particular, which is typically sufficient, however, if the auxiliary device is located sufficiently close to the hearing aid, for example within a distance of less than 0.5 m.

In one advantageous embodiment, sound signals from the environment are received by the hearing aid and used as input signals for a game which is active on the auxiliary device. The game is used, for example, to illustrate or explain a function of the hearing aid or implements a training in dealing with the hearing aid or a hearing training. An embodiment is suitable, for example, in which the user is given a task in the context of the game which he or she is to achieve, for example by his or her own behavior and/or by means of corresponding usage or operation of the hearing aid. One exemplary game gives the user the task of moderating a conversation between two persons in such a way that they have an equal conversation component in the conversation within a tolerance. For a hearing training, for example, the user is given the task of locating a specific sound situation, for example a conversation, or a specific sound type, e.g., a bird, a person, or live music, in the environment.

A hearing system according to the invention is designed to carry out a method as described above. The hearing system preferably includes a control unit for this purpose. The method is implemented in the control unit in particular by programming or circuitry or a combination thereof. For example, the control unit is designed for this purpose as a microprocessor or as an ASIC or as a combination thereof. The control unit is expediently allocated onto the hearing aid and the auxiliary device. The above-described method steps may in principle be allocated substantially arbitrarily onto the auxiliary device and the hearing aid.

The computer program product according to the invention contains an executable program, which automatically executes the method as described above during or after installation on a hearing system as described above. The program is installed either on the hearing aid or on the auxiliary device or both. An embodiment is particularly expedient in which the computer program product is an app for installation on the auxiliary device. By means of the app, the auxiliary device receives the information from the hearing aid and generates therefrom a suitable image element, which is then overlaid with the real-time image from the camera in order to display an augmented reality on the display screen.

Other features which are considered as characteristic for the invention are set forth in the appended claims.

Although the invention is illustrated and described herein as embodied in a method for operating a hearing system and a hearing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
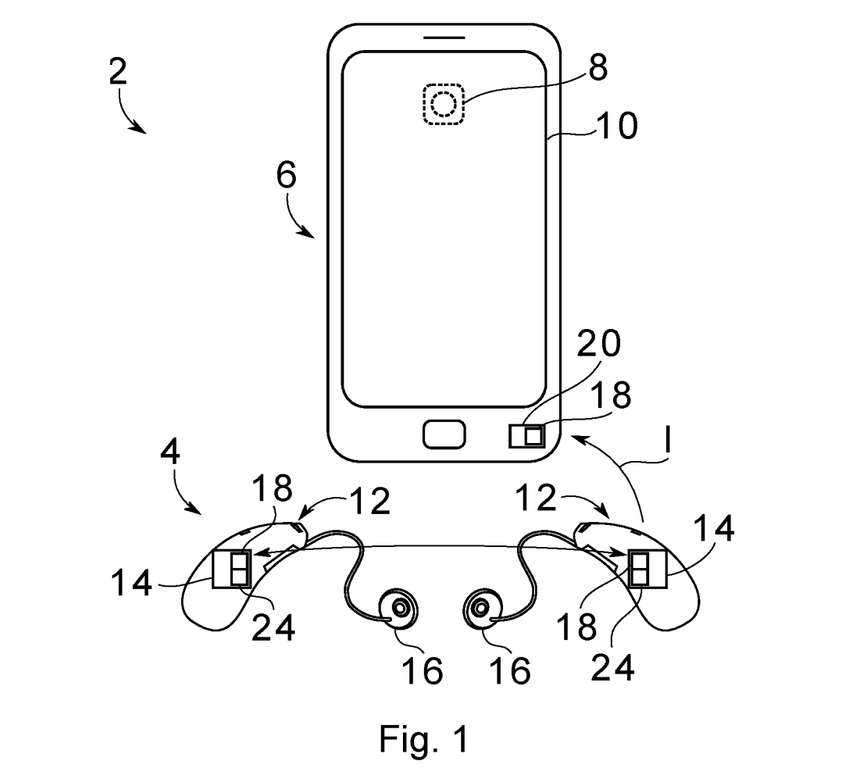
FIG. 1 is an illustration showing a user and a hearing system.
Figure 2:
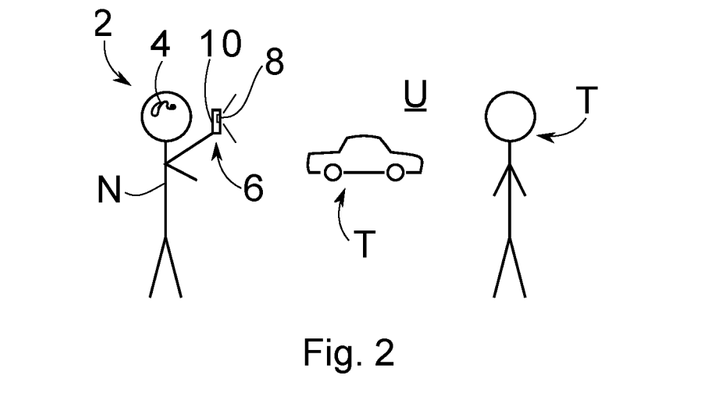
FIG. 2 is an illustration showing the hearing system from FIG. 1.
Figure 3:
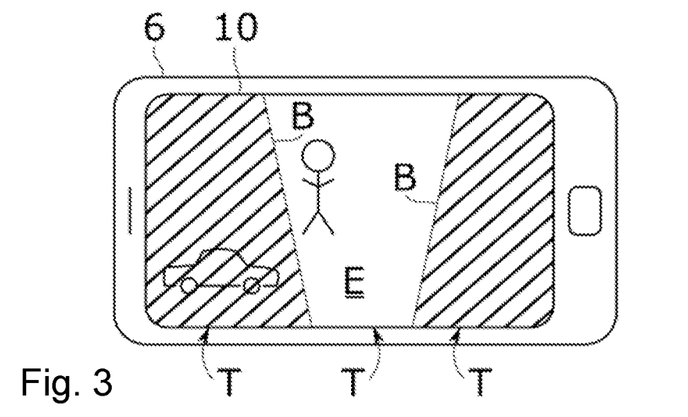
FIG. 3 is an illustration showing an auxiliary device of the hearing system from FIG. 2, having an augmented real-time image.

A method for operating a hearing system 2 and such a hearing system 2 are described hereinafter on the basis of the figures. An exemplary embodiment of a hearing system 2 is shown in FIG. 1. The hearing system 2 includes a hearing aid 4, which is worn by a user N, for example as shown in FIG. 2. Furthermore, the hearing system 2 includes an auxiliary device 6, which includes a camera 8, by means of which a real-time image E is recorded of a current environment U. The auxiliary device 6 includes a display screen 10, on which the real-time image E is output, so that the environment U is displayed on the display screen 10. The auxiliary device 6 is shown from the front in FIG. 2, so that the display screen 10 is visible, while in contrast the camera 8 is located on a rear side of the auxiliary device 6 and is therefore shown by dashed lines.

The hearing aid 4 is used in the present case to care for a hearing-impaired user N. For this purpose, the hearing aid 4 includes at least one microphone 12, which receives sound from the environment U and generates an electrical input signal. This is supplied for modification to a signal processing unit (not explicitly shown) of the hearing aid 4. The signal processing unit is a part of a control unit 14 of the hearing aid 2 here. The signal processing unit outputs as a result an electrical output signal, which is then converted back into sound via a receiver 16 of the hearing aid 4 and is output to the user N. In the present case, the hearing aid 4 is even a binaural hearing aid, having two individual devices as is recognizable in FIG. 1, which each include at least one microphone 12 and one receiver 16 and which are worn by the user N on different sides of the head, namely once on or in the left ear and once on or in the right ear.

The auxiliary device 6 is in the present case an individual device, in which the camera 8 and the display screen 10 are combined. For this purpose, the auxiliary device 6 is especially a smart phone. In an alternative (not shown), the auxiliary device 6 includes the camera 8 and the display screen 10 as two separate devices.

To transmit the information, the hearing aid 4 and the auxiliary device 6 each have an interface 18 for data transmission, for example a Bluetooth interface, and are connected or coupled to one another via these interfaces 18. During the data transmission, at least the information is transmitted from the hearing aid 4 to the auxiliary device 6. The data transmission takes place, for example from both individual devices in each case to the auxiliary device 6 or as shown in FIG. 2 from one individual device to the other individual device and collected by this to the auxiliary device 6. The information I does not necessarily originate from both individual devices, however, but can also be generated by only one of the individual devices under certain circumstances depending on the type of the information I.

In the exemplary embodiments shown, an augmented reality is generated on the auxiliary device 6 by a linkage of the environment U to items of information I, i.e., data from the hearing aid 4. For this purpose, the hearing aid 4 transmits an item of information I to the auxiliary device 6, which is linked to a section T of the environment U and is thus an item of information I on this section T. The information I is then displayed on the display screen 10 in that an image element B is generated and is overlaid with the real-time image E in such a way that it is recognizable to the user N with which section T of the environment U the information I is linked. The information I from the hearing aid 4 is thus projected as a virtual image in a depiction of the real environment U. The relationship between the environment U and the items of information I from the hearing aid 4 is thus illustrated to the user N on the display screen 10 and furthermore an intuitive approach to understanding the operation of the hearing aid 4 is enabled for the user N.

The information I generally describes here a property or an aspect of the section T or an object therein or a setting of the hearing aid 4 for interaction with the section T or an object therein. The information I is thus an item of environmental or hearing aid information and specifies how the hearing aid 4 assesses (environmental information) or processes (hearing aid information) a sound signal from a section T of the environment U. The information I is, for example a specific value of an operating parameter of the hearing aid 4 and then an item of hearing aid information or a value of a property of a section T of the environment U, especially of a sound signal from this section T, and then an item of environmental information.

The information I is displayed in a certain way on the display screen 10, namely not once solely as a datum without reference to the environment U, but rather as an overlay in such a way that the information I is visually associated in the real-time image E with the section T of the environment U which is linked to the information I. For this purpose, the information I is converted for display into an image element B, which is overlaid with the real-time image E, so that an augmented reality is displayed on the display screen 10, in which the real-time image E is the reality and the image element B, i.e., the information I is an augmentation of this reality. In these terms, the real-time image E is real, since its elements are acquired by the camera 8, and the image element B is virtual, since it is not acquired by the camera 8, but rather is additionally created, in the present case by a control unit 20 of the auxiliary device 6.

The environment U is typically divided into multiple sections T, so that accordingly the real-time image E is also divided into multiple image parts, wherein each image part represents one section T and vice versa, so that for the sake of simplicity the image parts are also marked as sections T in FIGS. 3-11. A respective section T is, for example, a spatial region which is occupied by an object, for example a person, or an angle region or spatial angle region, for example the environment U is divided starting from the user N into multiple angle regions, or the section T is a region of the environment U at least partially delimited in another way. The precise delimitation of the section T in relation to the remaining environment U is dependent in particular on the type of the information I.

The image element B is, for example, a marking, which points to the section T or is displayed therein or thereon, e.g., a symbol, an icon, an arrow, a cross, a circle, a line, or the like. Alternatively, the image element B is a text element in or on the section T, a frame around the section T, a border of the section T, a color, transparency, image sharpness, or contrast of that part of the real-time image E which shows the section T, or lines for marking the section T. Combinations of the above-mentioned embodiments are also possible and suitable. Various examples of image elements B are shown in the figures.

In one possible embodiment, a relative location of the hearing aid 4 and the auxiliary device 6 in relation to one another is determined in order to be able to reproduce the linkage of the information I to the section T particularly accurately in this way. In principle, however, an embodiment is also possible in which the relative location is estimated without additional measurement. For example, in the case of a smart phone as the auxiliary device 6, it is presumed that the user N holds it at a distance of less than 10 cm in front of him and approximately at eye height as shown in FIG. 2, so that it is then presumed that the auxiliary device 6 is located, for example 20 cm in the viewing direction R in front of the hearing aid 4. For the hearing aid 4, it is presumed that it is worn in or on one or both ears of the user N, as also shown in FIG. 2.

Figure 4:
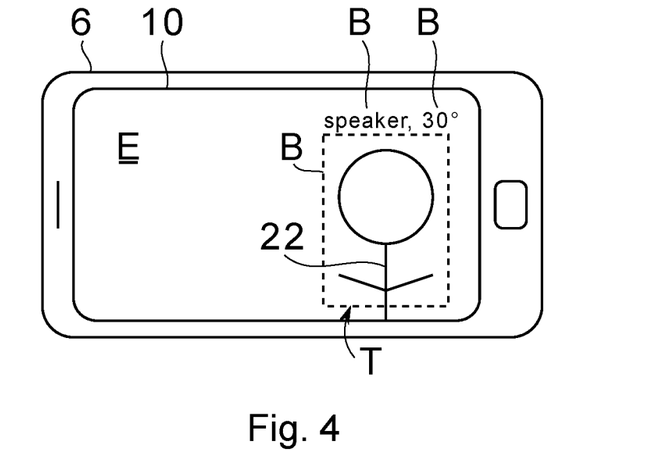
FIGS. 4-11 are illustrations each showing the auxiliary device from FIG. 3, with a variant of the augmented real-time image.

FIG. 4 shows an embodiment in which the information I is a presence of a sound source 22 in the section T. The hearing aid 4 recognizes the presence of the sound source 22 and transmits this to the auxiliary device 6, for display in the real-time image E. The image element B then marks the section T therein, in order to indicate the presence of the sound source 22 therein. It is thus immediately recognizable to the user N on the display screen B where in the environment U the hearing aid 4 recognizes a sound source 22. In the exemplary embodiment of FIG. 4, the hearing aid 4 additionally also recognizes the position of the sound source relative to the hearing aid 4, i.e., the section T in which the sound source 22 is located. This position is also transmitted to the auxiliary device 6, so that it indicates the presence at the corresponding position in the real-time image E. The image element B for displaying the presence of the sound source 22 is shown as a frame around the sound source 22 as an example in FIG. 4.

In addition, in the exemplary embodiment of FIG. 4, the hearing aid 4 also determines a class of the sound source 22, i.e., which type the sound source 22 is. For this purpose, the hearing aid 4 includes, for example, a classifier (not explicitly shown), for example as part of the control unit 14. The class is also an item of information I, which is displayed at a corresponding point in the real-time image E. To illustrate the class of the sound source 22, a text element is used as the image element B in FIG. 4, which explicitly specifies the class "speaker" (i.e., conversation partner) here, and is arranged on the frame, so that it is recognizable that the class is associated with the marked sound source 22.

In FIG. 4, the sound source 22 is specifically a conversation partner of the user N and is marked as such in the real-time image E by means of multiple image elements B. It is thus immediately recognizable to the user N via the display screen 10 where the hearing aid 4 has identified a conversation partner in the environment U. In addition, in FIG. 3 an angle, at which the sound source 22 is located relative to the viewing direction R of the user N, is also indicated with a further image element B in the real-time image E. In the present case, the angle is simply displayed as a number in the vicinity of the sound source 22 as an image element B in such a way that the angle is associated as clearly as possible with this sound source 22 for the user N. Alternatively or additionally, the angle is represented in another embodiment as a pair of two lines or arrows, one in the viewing direction R and a further from the user N toward the sound source 22, cf., for example, FIG. 7.

Figure 5:
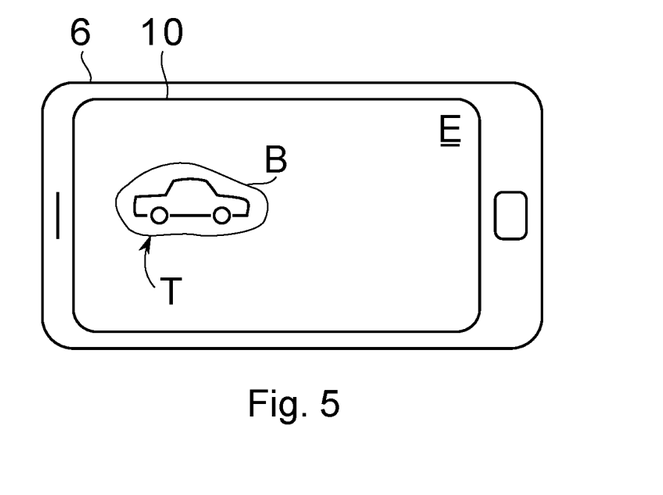

In the embodiment shown in FIG. 5 4, the information I is a signal-to-noise ratio, abbreviated to SNR, of the section T. The hearing aid 4 measures the SNR in the section T, for example by means of an analysis unit as part of the control unit 14. The SNR is then transmitted to the auxiliary device 6 as information I for display in the real-time image E. The image element B then specifies the SNR, more precisely the SNR for the section T. Correspondingly, the SNR is measured separately in each case for multiple different sections T and thus an SNR map is more or less overlaid on the real-time image E on the display screen 10, so that the user N can immediately read off the SNR for a respective section T of the environment U. A section T is recognizable in FIG. 5 which is marked by an area having a border as the image element B. An object is located in the section T, a vehicle as an example here, which results in a lower SNR in the section T than in the remaining environment U.

FIG. 5 shows an embodiment in which the information I indicates whether an interference noise suppression 24 of the hearing aid 4 is activated for the section T. The interference noise suppression is part of the control unit 14 of the hearing aid 4 here and is designed in such a way that in the activated state it suppresses interference noises in the input signal. The interference noise suppression 24 is selectively activatable for one or more sections T, so that different sections T and interference noise sources located therein can be suppressed at different strengths. The image element B now indicates whether the interference noise suppression is activated for the respective section T. In one embodiment (not explicitly shown), the information I not only indicates whether an interference noise suppression 24 is activated for the section T, but more precisely how strongly interference noises from the section T are suppressed by the interference noise suppression 24.

Figure 6:
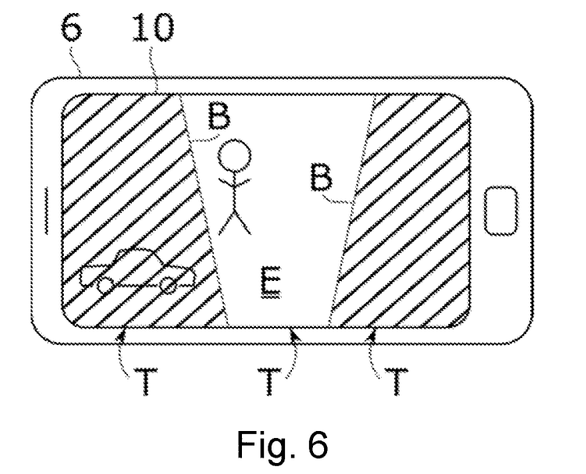

In one possible embodiment, the image element B is a colored or transparent area or both, which is overlaid in the real-time image E with the section T, so that it is displayed colored or transparent or both as a function of the information I. For example, in FIG. 5, sections T of the environment U having low SNR are colored green on the display screen 10 and those having high SNR are colored red, so that then the section T having the vehicle is correspondingly colored red and the remaining part of the real-time image E is colored green. Especially with such a coloration of entire areas of the real-time image E, a transparent image element B is expedient in order to ensure optimum recognizability of the real-time image E located behind it. In FIG. 6, the display is discrete, for example, in such a way that those sections T for which the interference noise suppression is active are overlaid with image elements B, a color here, which is shown as a shading in FIG. 6. That section T for which the interference noise suppression is not active, in contrast, is not overlaid with an image element B.

The embodiments described up to this point predominantly relate to items of information I which are environmental items of information, i.e., items of information which are properties of the environment U and which are ascertained by the hearing aid 4 by an analysis of sound signals from the environment U. In the case of hearing aid items of information, such an analysis of the environment U is initially not absolutely necessary, rather a representation of such items of information I is intended to illustrate the behavior of the hearing aid 4 relative to the environment U to the user N. The representation of a hearing aid item of information in the case of a hearing aid 4 is described hereinafter, which is designed for directional hearing and for this purpose includes a microphone 12, which is designed as a directional microphone, in order to emphasize sound signals from a specific direction, i.e., from a specific section T, over sound signals from other directions, i.e., from other sections T.

Figure 7:
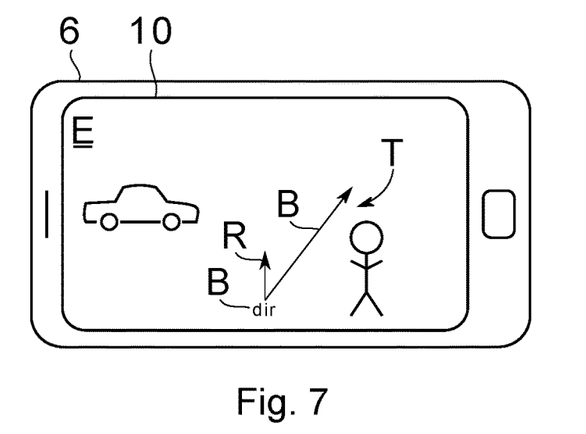
Figure 8:
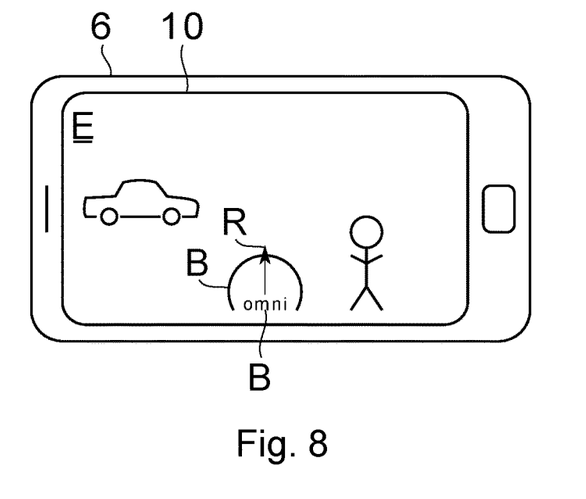

In the exemplary embodiment of FIGS. 7 and 8, the hearing aid 4 is switchable between a non-oriented and an oriented operating mode. FIG. 7 illustrates how the image element B indicates in the oriented operating mode which section T of the environment U is emphasized over the remaining environment U. In the non-oriented operating mode, in contrast, no image element is displayed or, as shown in FIG. 8, the image element B indicates that no section T of the environment U is emphasized. It is then immediately recognizable to the user N on the display screen 10 whether the hearing aid 4 is in the non-oriented operating mode (also: omnidirectional operation) or in the oriented operating mode (also: directional operation, for example mono-directional or multidirectional operation). In the latter case, it is then also immediately recognizable for the user on which section T or on which sections T the directional microphone is oriented.

Figure 9:
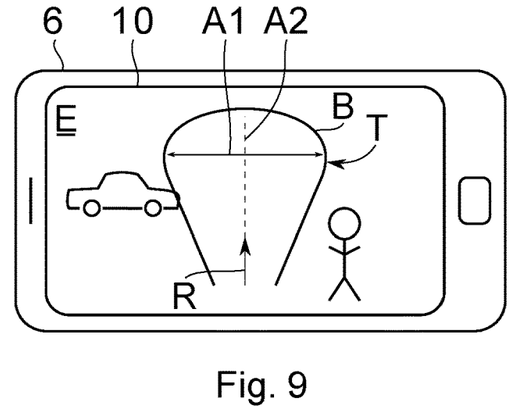
Figure 10:
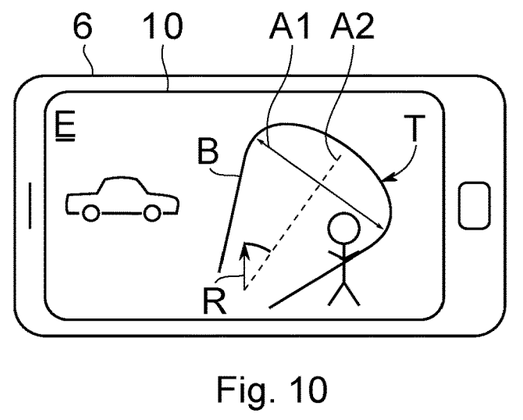

In one embodiment, the hearing aid 4 includes a microphone 12 having at least one directional lobe which is oriented on a section T and covers it, so that corresponding sound signals from this section T are emphasized over sound signals from other sections T. The information I is then, for example a dimension A1, a width here, or an alignment A2, a direction here, of the directional lobe. The image element B represents, as shown in FIGS. 9 and 10, the directional lobe and thus indicates in the real-time image E which section T of the environment U is covered by the directional lobe and accordingly from which section T sound signals are emphasized. The image element B is a visual representation of the directional lobe here. However, for example, a single line as shown in FIG. 7, for example, or another representation is also suitable. Since the directional lobe is not visible to the user N in the actual environment U, an intuitive representation of the directional lobe and its location in the environment U is offered to the user N via the display screen 10 in this way, so that the user N can recognize immediately and without further exertion how the directional lobe is dimensioned and/or aligned relative to the environment U and accordingly which sections T of the environment U and thus which sound sources are possibly affected thereby.

In FIGS. 9 and 10, the display screen 10 of the auxiliary device 6 is also designed as an input device, by means of which one or more operating parameters of the hearing aid 4 are settable. The effects of a respective setting are immediately recognizable to the user N on the basis of the real-time image E and the information I overlaid thereon. Thus, in FIGS. 9 and 10, the dimension A1 and the alignment A2 of the directional lobe are settable by the user N directly in the real-time image E, so that the user can simply align, for example, the directional lobe aligned in the viewing direction R in FIG. 9 in another direction as shown in FIG. 10.

In one embodiment (not explicitly shown), alternatively or additionally to the display screen 10 as the input device, the auxiliary device 6 and/or the hearing aid 4 includes one or more operating elements, for setting one or more operating parameters of the hearing aid 4. The effects of a setting by means of these operating elements are then immediately recognizable to the user N on the display screen 10.

Figure 11:
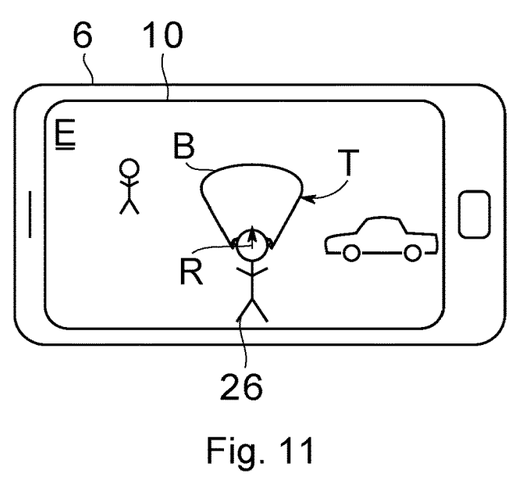

An embodiment is shown in FIG. 11 in which an avatar 26 is overlaid with the real-time image E in order to indicate a position of the user N in the environment U therein. The avatar 26 is a virtual representation of the user N on the display screen 10 and thus locates the user N within the augmented reality. Since in the case shown, the user N and the camera 8 are located on different sides of the display screen 10, the positioning of the avatar 26 merely represents an approximation, which is sufficient, however, since the auxiliary device 6 is located sufficiently close to the hearing aid 4.

In one embodiment (not explicitly shown), sound signals from the environment U are received by the hearing aid 4 by means of at least one microphone 12 and used as input signals for a game, which is active on the auxiliary device 6.

The hearing system 2 shown is designed to carry out a method as described above. The hearing system 2 includes a control unit for this purpose, which is allocated onto the hearing aid 4 and the auxiliary device 6 and is formed from their control units 14, 20, as is apparent in FIG. 1. In principle, the described method steps may be allocated substantially arbitrarily onto the auxiliary device 6 and the hearing aid 4.

The concepts described in conjunction with the figures are fundamentally independent of one another as are the various embodiments shown, so that further embodiments and exemplary embodiments result by way of other combinations of the described concepts.

The following is a summary list of reference numerals and the corresponding structure used in the above description of the invention:
2 hearing system
4 hearing aid
6 auxiliary device
8 camera
10 display screen
12 microphone
14 control unit (of the hearing aid)
16 receiver
18 interface
20 control unit (of the auxiliary device)
22 sound source
24 interference noise suppression
26 avatar
A1 dimension
A2 alignment
B image element
E real-time image
I information
N user
R viewing direction
T section
U environment

The invention claimed is:

1. A method for operating a hearing system having a hearing aid worn by a user, an auxiliary device with a camera and a display screen, which comprises the steps of:
   recording, via the camera, a real-time image of an environment;
   outputting the real-time image to the display screen so that the environment is displayed on the display screen;
   transmitting, via the hearing aid, an item of information to the auxiliary device, which is linked to a section of the environment and is thus an item of information with respect to the section; and
   displaying the item of information also on the display screen, in that an image element is generated and is overlaid with the real-time image in such a way that it is recognizable for the user with which section of the environment the item of information is linked.

2. The method according to claim 1, wherein:
   the item of information is a presence of a sound source in the section;
   the hearing aid recognizes the presence of the sound source; and in the real-time image, the image element marks the section, in order to indicate the presence of the sound source therein.

3. The method according to claim 2, wherein the sound source is a conversation partner of the user and is marked as such in the real-time image by means of the image element.

4. The method according to claim 2, which further comprises displaying an angle in the real-time image, in which the sound source is located relative to a viewing direction of the user.

5. The method according to claim 1, wherein:
the item of information is a signal-to-noise ratio of the section;
the hearing aid measures the signal-to-noise ratio in the section; and
the image element indicates the signal-to-noise ratio.

6. The method according to claim 1, wherein the item of information indicates whether an interference noise suppression of the hearing aid is activated for the section, so that the image element indicates whether the interference noise suppression is activated for the section.

7. The method according to claim 1, wherein the image element is a colored or transparent area or both, which is overlaid in the real-time image with the section, so that the real-time image is displayed colored or transparent or both depending on the item of information.

8. The method according to claim 1, wherein:
the hearing aid is switchable between a non-oriented operating mode and an oriented operating mode;
in the oriented operating mode the image element indicates which section of the environment is emphasized over a remaining environment; and
in the non-oriented operating mode no said image element is displayed or the image element indicates that no section of the environment is emphasized.

9. The method according to claim 1, wherein:
the hearing aid includes a microphone, which is configured as a directional microphone, having at least one directional lobe, which is oriented on the section and covers the section;
the item of information is a dimension or an alignment of the at least one directional lobe or both; and
the image element represents the at least one directional lobe and thus indicates in the real-time image which section of the environment is covered by the at least one directional lobe.

10. The method according to claim 1, wherein the display screen is further configured as an input device, by means of which at least one operating parameter of the hearing aid is settable.

11. The method according to claim 1, which further comprises overlaying an avatar with the real-time image in order to indicate a position of the user in the environment therein.

12. The method according to claim 1, wherein sound signals from the environment are received by the hearing aid and used as input signals for a game, which is active on the auxiliary device.

13. The method according to claim 1, wherein the auxiliary device is a mobile terminal.

14. The method according to claim 1, wherein the auxiliary device is a smart phone.

15. A hearing system, comprising:
a hearing aid worn by a user and having an auxiliary device with a camera, a display screen, and a processor, said processor configured to:
record, via said camera, a real-time image of an environment;
output the real-time image to said display screen so that the environment is displayed on said display screen;
transmit, via said hearing aid, an item of information to said auxiliary device, which is linked to a section of the environment and is thus an item of information with respect to the section; and
displaying the item of information also on said display screen, in that an image element is generated and is overlaid with the real-time image in such a way that it is recognizable for the user with which section of the environment the information is linked.

16. A non-transitory computer medium containing computer executable code for performing a method of operating a hearing system having a hearing aid worn by a user, an auxiliary device with a camera and a display screen, which comprises the steps of:
recording, via the camera, a real-time image of an environment;
outputting the real-time image to the display screen so that the environment is displayed on the display screen;
transmitting, via the hearing aid, an item of information to the auxiliary device, which is linked to a section of the environment and is thus an item of information with respect to the section; and
displaying the item of information also on the display screen, in that an image element is generated and is overlaid with the real-time image in such a way that it is recognizable for the user with which section of the environment the information is linked.

* * * * *